United States Patent [19]

Toman

[11] Patent Number: 4,742,121
[45] Date of Patent: May 3, 1988

[54] ACRYLATE RESIN GEL COAT COMPOSITION

[75] Inventor: Perry A. Toman, Medina, Ohio

[73] Assignee: The Glidden Company, Cleveland, Ohio

[21] Appl. No.: 927,950

[22] Filed: Nov. 7, 1986

Related U.S. Application Data

[63] Continuation-in-part of Ser. No. 728,399, Apr. 29, 1985, abandoned.

[51] Int. Cl.$^4$ ............................................. C08F 265/04
[52] U.S. Cl. ...................................... 525/286; 525/293; 525/303; 525/912; 525/913; 526/273; 526/320; 524/531; 524/558
[58] Field of Search ................ 428/442; 525/293, 286, 525/303; 526/320

[56] References Cited

U.S. PATENT DOCUMENTS

| | | | |
|---|---|---|---|
| 3,583,955 | 6/1971 | Holicky et al. | 525/286 |
| 3,607,973 | 9/1971 | Holicky et al. | 525/286 |
| 3,607,974 | 9/1971 | Holicky et al. | 525/286 |
| 3,632,796 | 1/1972 | Holicky et al. | 525/293 |
| 3,641,210 | 2/1972 | Fellers et al. | 525/286 |
| 3,642,939 | 2/1972 | Fellers et al. | 525/286 |
| 3,928,299 | 12/1975 | Rosenkranz et al. | 525/293 |

*Primary Examiner*—Carman J. Seccuro
*Attorney, Agent, or Firm*—Thomas M. Schmitz

[57] ABSTRACT

Improved coating compositions which incorporate acrylate resins having multiple carbon-to-carbon bond unsaturation attached to the polymer chain through ester and/or urethane linkage are derived from the reaction product of:

(1) an acrylate resin having multiple epoxide functionality attached to the polymer chain through an ester or ether linkage reacted with an unsaturated carboxylic acid preferably acrylic or methacrylic acid; or (2) an acrylate resin having multiple hydroxyl group functionality reacted with an organoisocyanate having 0.5 to 1.0 unit of carbon-to-carbon unsaturation per mole of isocyanate.

Such coatings are particularly useful in formulating gel coat composites which exhibit hydrolytic stability and good weatherability.

7 Claims, No Drawings

ACRYLATE RESIN GEL COAT COMPOSITION

This is a continuation-in-part of copending Ser. No. 728,399 filed Apr. 29, 1985, now abandoned, and the same is incorporated herein by reference.

This invention relates to novel low molecular weight unsaturated acrylic resin coatings derived from epoxy and hydroxyl functional acrylate polymers extended with unsaturated monocarboxylic acids or with organoisocyanates having carbon-to-carbon bond unsaturation. All molecular weights herein are numbers average molecular weights as measured by GPC according to ASTM tests D3016-72; D3536-76; D3593-80; or D3016-78.

BACKGROUND OF THE INVENTION

Conventional gel coat compositions, typically formulated from polyester, acrylate, and urethane type resins and combination thereof are useful as the exterior paint layer for boats and bathroom fixtures such as shower stalls, bath tub enclosures, and the like. A gel coat is a pigmented, filled, and prepromoted resin (usually polyester) which is sprayed with an initiator onto molds from a high pressure spray gun to a film thickness of up to 0.75 mm. The film cures prior to reinforcement with glass fibers and laminating resins. The gel coat should exhibit low viscosity at high shear, should resist sagging, and produce a gel time of 8–12 minutes. For marine applications the products should exhibit hydrolytic stability and good weatherability.

Use of unsaturated polyesters in admixture with unsaturated aromatic monomers such as styrene used for the production of crosslinked polymers initiated by peroxide is a well-known art. The unsaturated polyesters are prepared from the condensation of unsaturated acids or acid anhydrides will polyols. The most common unsaturated acid used is either maleic anhydride or fumaric acid. Because ester linkages formed from these materials exhibit poor hydrolysis resistance, the overall film performance of a coating film based on these polymers is somewhat poor. In addition, an aromatic diacid, such as isophthalic acid, is generally present to help improve the hydrolysis resistance of the film. However, the presence of the aromatic nuclei lends poor exterior durability to the coating film.

Vinyl esters, formed from the reaction of an aromatic polyepoxide with an unsaturated monocarboxylic acid have excellent hydrolysis resistance. However, the presence of the aromatic nuclei and the necessity of addition of high levels of unsaturated aromatic monomers to obtain a sprayable viscosity leads to unacceptable exterior durability. Vinyl ester resin based on aliphatic polyepoxides exhibit poor hydrolysis resistance.

A coassigned application now being U.S. Pat. No. 4,587,323 filed concurrently has relevancy to the instant case in that it pertains to the same end use. U.S. Pat. No. 4,304,883 (1981) (Fujii, Tanaka et al) teaches unsaturated polyester resins for coating metal substrate comprising a vinyl monomer and a dicyclopentadiene modified alkyd. U.S. Pat. No. 4,320,221 teaches the reaction of ethylenically unsaturated monofunctional isocyanate and a difunctional polyol as an anerobic adhesive. Other coatings incorporate conventional isophthalic and phthalic based urethane polyesters having various pendant unsaturation.

Urethanes have been incorporated into useful coatings via various techniques. U.S. Pat. No. 3,928,299 (1975) teaches vinyl solution polymers which contain urethane groups and are crosslinkable by vinyl or vinylidene polymerizatiin. The urethane groups are introduced by reacting hydroxy groups pendant from the acrylate backbone with isocyanoalkyl acrylates or methacrylates. Urethane modified epoxy ester resins are taught in U.S. Pat. No. 3,478,126.

Unruh and Smith, U.S. Pat. No. 2,887,469 (1959), teach urethane derivatives of hydroxy containing polymers such as ethyl cellulose, cellulose acetate using monohaloalkyl isocyanate and quaternary urethanes formed with tertiary amines. U.S. Pat. No. 2,768,154 teaches the polymeric carbalkoxy urethane via the reaction of carbalkoxy isocyanate (O=C=N—R—COOR$^1$) with hydroxy functional polymers. U.S. Pat. No. 4,446,175 and U.S. Pat. No. 4,436,885 (1984) teach isocyanate-functional acrylic solvent copolymers of 2-isocyanotoethyl (meth)acrylate with other acrylate monomers in the presence of a mercaptan chain-transfer agent.

U.S. Pat. No. 4,320,221 (1982) teaches the reaction of ethylenically unsaturated monofunctional isocyanate and a difunctional polyol as an anerobic adhesive.

U.S. Pat. No. 4,287,323 (1981) teaches addition polymerizable polyethers having pendant ethylenically unsaturated urethane groups as useful flooring materials. Such urethane polyethers are prepared by reacting a polyether polyol (hydroxy terminated polypropylene glycol) with an isocyanatoalkyl (meth)acrylate.

U.S. Pat. No. 4,273,690 (1981) teaches a graft copolymer binder for coatings having an acrylic backbone and alkyd resin chains attached to the backbone by an isocyanate group reactive with the hydroxyl or carboxylic group of the alkyd resin.

Others have attempted to reduce gel coat problems such as blistering or extended water exposure by increasing the film thickness of the gel coat (See Denoms et al, Annual Conference, Reinforced Plastics/Composites Institute, The Society of the Plastics Industry, Inc., Feb. 7–11, 1983)

Vinyl esters based on aromatic polyepoxide resin reacted with unsaturated monocarboxylic acid and other moieties are exemplified in U.S. Pat. Nos. 3,367,992; 3,066,112; and 3,179,623. The presence of the aromatic nuclei and the necessity of adding high levels of unsaturated aromatic monomers to obtain a sprayable viscosity leads to unacceptable exterior durability while those based on aliphatic polyepoxides show poor hydrolysis resistance.

The above deficiencies have been largely overcome by the gel coats of the present invention based on acrylate resins containing pendant carbon-carbon unsaturation. The improved coatings provide gel coats with low viscosity and excellent hydrolytic and weathering stability.

BRIEF SUMMARY OF THE INVENTION

The invention relates to improved coating compositions which incorporate resins having an acrylate backbone and pendant carbon-to-carbon bond unsaturation, said resins derived from the reaction product of:
(1) an acrylate polymer having pendant epoxide functionality attached to the polymer chain through an ester or ether linkage with an unsaturated carboxylic acid, preferably acrylic acid or methacrylic acid; or
(2) an acrylate polymer having pendant hydroxyl group functionality with a reactive isocyanate having at least one carbon-to-carbon bond unsaturation
wherein said resin is substantially free of reactive epoxy and isocyanate functionality and contains from 1 to about 6 pendant carbon-to-carbon bond unsaturation per polymer resin unit.

A further aspect relates to gel coat paints derived from the above coatings and to articles of manufacture, particularly boats and sanitary wave formed with the above-described compositions and having improved hydrolytic and weathering characteristics.

DETAILED DESCRIPTION OF THE INVENTION

This invention relates to coating compositions and gel coat composites based on acrylic polymers having pendant curable vinyl or vinylic functionality attached to the acrylic polymer chain via ester and/or urethane linkages.

The use of unsaturated polymers and particularly polyesters prepared from unsaturated dicarboxylic acids is well known for coating purposes. While such esters contribute to the cure reaction, it is believed that such materials suffer from slow dry, improper film cure and poor hydrolysis resistance. This result is believed to result in part from internal burying of the carbon-to-carbon unsaturated cure linkages within the polymer molecule. One advantage of the instant invention is that it allows post-polymerization introduction of carbon-to-carbon unsaturation as part of the polymer, both end terminated and pendant to the polymer chain. Thus the cure sites are not embedded in the center of the polymer and remain available for cure reactivity via vinyl type polymerization with aromatic vinyl compounds such as styrene.

The instant polymers may be generically depicted by an acrylate chain having the following formula:

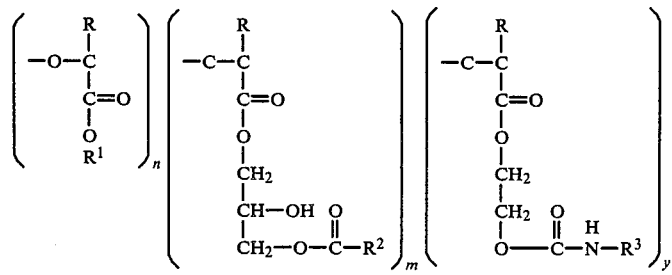

where R is methyl or hydrogen; $R^1$ is an alkyl group having up to 16 carbon atoms; $R^2$ is an unsaturated alkylene moiety, and $R^3$ alkyl or aralkyl residue having ethylenic unsaturated functionality derived from certain reactive isocyanates; and n, m, and y independently represent integers from 0 to 10 whose total is from about 5 to 16 and preferably about 10 such units; with the proviso that m and y cannot be equal to zero at the same time.

The acrylate resins of the instant invention comprises an acrylate backbone resin having pendant carbon-to-carbon bond unsaturation being the reaction product in one instance of an acrylate resin having multiple epoxide functionality which is further reacted with an unsaturated carboxylic acid such as, for example, acrylic acid or methacrylic acid. The acrylate resin having pendant epoxide functionality adapted for further reaction with the unsaturated acid can be synthesized in known fashion by the polymerization or copolymerization of acrylate and/or methacrylate esters with glycidyl acrylates preferably glycidyl methacrylates. Another approach would be to incorporate other epoxy monomers copolymerizable with the acrylate esters. Thus one may substitute, in whole or in part, $\alpha,\beta$-unsaturated ether in place of the glycidyl acrylate monomer. These ethers include, for example, allyl-glycidyl ether, ethylene glycol monoalkylmonoglycidyl ether, diethylene glycol-monoallyl monoglycidyl ether, glycerol diallyl-monoglycidyl ether and trimethylolpropane diallyl-monoglycidyl ether, and the like. Of the above types, allyl-glycidyl ether is preferred and glycidyl methacrylate is most preferred.

Referring next to the acrylate resins having functional hydroxy groups attached to the acrylate (vinyl) chain. These are synthesized by copolymerizing acrylic or methacrylate esters with hydroxyalkyl acrylates or methacrylates. Hydroxy ethyl methacrylate and hydroxypropyl methacrylate are the preferred monomers in this copolymerization. Following the polymerization the hydroxyl-bearing acrylates are next reacted with an isocyanate compound having carbon-to-carbon unsaturated sites. Such multifunctional isocyanates include for example isocyanatoalkyl acrylate and methacrylate esters and reactive isocyanates where the double bond carbon unsaturation is not part of an acrylate or methacrylate monomer. The latter include, for example, isopropenyl-substituted benzyl isocyanates, and particularly metaisopropenyl-alpha,alpha-dimethylbenzylisocyanate.

The level of glycidyl monomer can be varied quite widely over the range of from about 20 weight percent to as high as 90 weight percent basis total monomer used in forming the acrylate polymer having multiple epoxy functionality. Preferred compositions are those having up to 50 weight percent the remainder being made up of alkyl esters, hydroxy alkyl esters, and amino alkyl esters of acrylic and methacrylic acid. The alkyl esters can be used at concentration from 10 to 90 weight percent; the hydroxyalkyl esters at levels of 5-30 percent and the amino alkyl resins (i.e. dimethylaminoethyl methacrylate) at about 0.5 to 15 weight percent depending on the type of coating desired and the indicated end use.

The unsaturated acid used in combination with acrylic acid resin having reactive epoxide functionality is preferably used in stoichiometry quantity to react with most of the epoxy functionality. The acid should not be used in excess. The reaction is continued until the acid number is negligible or at least below 2. Similarly the unsaturated isocyanate is used in amounts relative to reactive hydrogen content of the acrylic resin to avoid any excess unreacted isocyanate functionality. Generally the isocyanate will be added in molar ratio versus hydroxyl functionality of 0.25 to 0.8 mole. It is important to have an excess of hydroxyl functionality remaining in the acrylate resin.

Although the functional acrylates described above are separately illustrated for simplicity, it is contemplated that acrylate resins can contain both types of reactive ethylenic functionality. Thus an addition polymer can be made by reacting one or more of each monomer types including alkyl acrylates, hydroxyalkyl acrylates, and glycidyl monomers. These intermediate resins having both hydroxyl and epoxy functionality can then be further reacted with the chain extender monomers such as the unsaturated carboxylic acids and the unsaturated urethane precursor monomers. When so combined, it is preferred to sequentially add the individual extender isocyanates first, then add to the extender carboxylic acid. Alternatively, both carboxylic acid and isocyanate extenders can be reacted with an intermediate resin containing only epoxy functionality. Reaction with the unsaturated acid provides hydroxyl group functionality adapted for further reaction with isocyanate. For the optimization of certain coating properties, depending on the end use, it may be preferred to prepare the individual types separately and simply mix them together in the paint formulation.

Useful acrylate or methacrylate esters are alkyl esters, hydroxyalkyl esters, glycidyl esters, and aminoalkyl esters. Illustrative acrylate esters include methyl acrylate, methyl methacrylate, ethyl acrylate, ethyl methacrylate, propyl acrylate, propyl methacrylate, n-butyl acrylate, isobutyl methacrylate, 2-ethylhexyl acrylate, 2-ethylhexyl methacrylate, lauryl acrylate, stearyl acrylate, nonyl methacrylate. Illustrative hydroxyalkyl esters include hydroxyethyl acrylate, hydroxymethyl acrylate, hydroxybutyl acrylate, hydroxyoctyl acrylate, and their methacrylate counterparts.

Illustrative unsaturated carboxylic acids include methacrylic acid, acrylic acid, butanedioc acid, maleic acid, fumaric acid and their precursor anhydrides. Illustrative monomers useful in preparing epoxy functional acrylate or methacrylate resins include glycidyl methacrylate, glycidyl acrylate, vinyl epoxide, allyl glycidyl ether, the reaction product of the mole bisphenol A, one mole of epichlorohydrin, and one mole allyl chloride. In addition to the above monomer, useful acrylate polymers can incorporate about 0–15 percent and preferably 0.5–5.0 weight percent amino alkyl acrylate and methacrylate esters. Preferred monomers of this type are the dialkylaminoalkyl esters such as dimethylaminoethyl methacrylate and diethylaminopropyl methacrylate.

Gel coat paints can be formulated from the coatings of this invention in the usual method. Gel coat formulations include pigments, extenders, promoters, catalysts, stabilizers and the like as practiced in the art and in part illustrated in the best mode examples. Such gel coats will typically comprise from about 50 to about 90 weight percent acrylate resin, preferably about 60 to 90 percent, and from about 10 to about 50 weight percent styrene or other vinyl monomer, said percentages being based on combined weights of resin and vinyl monomer.

TEST PANEL PREPARATION

Lupersol DDM-9 (1.2%) is added to the gel coat paint and stirred with a spatula for 30 minutes. Drawdown on a waxed and buffed flat tempered glass plate using a 7/16×16″ drawdown bar. After curing for 3–4 hours, 3 plys of fiberglass mat are applied with resin (30% mat/70% resin). Lupersol DDM-9 (1.2%) catalyst is added. Allow 40–60 minutes after the gel time of the laminating resin for cure. Remove the laminate from the mold and cut into test strips (film thickness 18–22 mls.).

BOILING WATER RESISTANCE

Coated test panels (4¼×4¼) are connected to the boiling water test tank (ANSI 2-124.1) and exposed to boiling water for 100+ hours. The exposed panels are rated on a scale of 0–5 for blisters, color change, change in fiber prominence, cracks and loss of visible gloss with 0=no change and 5=0 maximum change.

QUV WEATHERING

Coated test panels are subjected to the weathering test as per ANSI/ASTM G 53-77 test procedure using the standard cycle of 4 hours condensation at 50° C. followed by 8 hours UV exposure at 70° C. Test panels are inspected at intervals of 150 hours.

Although the following examples are representative of the invention, they should not be read in a restrictive manner. All parts and percentages are by weight and all temperatures are expressed in degrees Centigrade unless otherwise specified.

EXAMPLE 1

Preparation of acrylic resin with glycidyl-monocarboxylic acid functionalization.

An acrylic resin solution is prepared by charging the following constituents into a polymerization vessel equipped with a thermometer, a stirrer, a reflux condenser and an addition funnel.

|  | Parts by Weight | Grams |
|---|---|---|
| Portion 1 | | |
| Xylene | 50.0 | 960 |
| Portion 2 | | |
| Butyl Acrylate | 54.0 | 1036 |
| Glycidyl Methacrylate | 46.0 | 884 |
| Azobisisobutyronitrile | 6.1 | 117 |
| Portion 3 | | |
| Azobisisobutyronitrile | 0.2 | 4 |
| Portion 4 | | |
| Benzoquinone | 0.15 | 0.3 |
| 2,4,6 Tri(dimethylaminomethyl) Phenol | 0.1 | 2 |
| Portion 5 | | |
| Methacrylic Acid | 19.53 | 375 |
| Portion 6 | | |
| Styrene | 20.78 | 399 |

Portion 1 is added to the vessel and heated to its reflux temperature (135°–140° C.). Portion 2 is premixed and added over 2.5–3.5 hours while maintaining the reaction mixture at its reflux temperature. After all of portion 2 has been added, the reaction mixture is held for 15 minutes. Then portion 3 is added. The mixture is then held at reflux for an additional 30 minutes. The reaction vessel is then fitted with a downward condenser and a vacuum is pulled to remove the solvent. The reaction mixture is then cooled to 120° C. and portion 4 is added. Next portion 5 is added dropwise over 1–2 hours after which the reaction mixture is held at 120° C. until the reaction is completed as determined by acid number titration <2. The mixture is then cooled to 90°–100° C. and portion 6 is added.

EXAMPLE 2

Using the product of Example 1, a white gel coat was prepared by blending together the following ingredients:

| Component | Weight Percent |
| --- | --- |
| Acrylic Resin Solution from Example 1 | 58.8 |
| Potassium Hex-Cem* | 0.25 |
| Crayvallac | 1.75 |
| "Aerosil" 200 | 0.5 |
| "Mistron" Monomix | 10.0 |
| Titanium Dioxide | 11.0 |
| "Cem-All"* 12% Cobalt | 0.3 |
| Styrene | 17.2 |
| Ethylene Glycol | 0.2 |
| Amber Wax | 0.044 |

*Potassium Hex-Cem and Cem-All are trademarks of Mooney Chemicals; Lo-Vel is a trademark of PPG Industries; Mistron is a trademark of Cyprus Industrial Minerals Co.; Aerosil is a trademark of Degussa, Inc.

The coating was applied onto an inverse mold by airless spray, pot gun spray or by brushing to deposit a film layer. After standing at room temperature overnight, the panels were evaluated using the boiling water test and the QUV accelerated weathering test. The results, compared with a conventional unsaturated polyester, are shown in Table I. The panel immersed in boiling water for 100 hours exhibited only slight blistering and slight loss of gloss. Using the QUV weathering test, there was no loss of gloss at 150 hours and the panel retained 60.5 percent gloss at 300 hours.

EXAMPLE 3

Preparation of an acrylic resin based on hydroxy-isocyanato methacrylate functionalization. An acrylic polymer solution is prepared according to the procedure of Example 1 with the following components:

|  | Parts by Weight | Grams |
| --- | --- | --- |
| Portion 1 | | |
| Xylene | 33.3 | 194 |
| Portion 2 | | |
| Butyl Acrylate | 70 | 408 |
| 2-Hydroxyethyl Acrylate | 30 | 175 |
| Azobisisobutyronitrile | 4.4 | 26 |
| Portion 3 | | |
| Azobisisobutyronitrile | 0.22 | 1.3 |
| Portion 4 | | |
| Dibutyl Tin Dilaurate | 0.25 | 1.5 |
| Ionol | 0.024 | 0.14 |
| Portion 5 | | |
| Isocyanatoethyl Methacrylate | 40.125 | 234 |
| Portion 6 | | |
| Styrene | 36.13 | 211 |

Portion 5 is added at 80° C.

EXAMPLE 4

A white gel coat paint is prepared from the resin of Example 3 by blending the following ingredients:

| Component | Weight Percent |
| --- | --- |
| Acrylic Resin from Example 3 | 61.88 |
| Potassium Hex-Cem | 0.25 |
| "Aerosil" 200 | 1.5 |
| "Lo Vel" 27 | 2.5 |
| "Mistron" Monomix | 10.0 |
| Titanium Dioxide | 11.0 |
| "Cem-All" 12% Cobalt | 0.3 |
| Styrene | 12.37 |
| Ethylene Glycol | 0.2 |

The results of the boiling water and accelerated weathering tests are shown in Table I. There was virtually no loss in gloss and only slight blistering after the panel was immersed in boiling water for 100 hours. In the weathering test (QUV) approximately 90 percent of the gloss was retained at 300 hours.

EXAMPLE 5

If the procedure of Example 3 is repeated using meta-isoproperylalpha,alpha-dimethylbenzylisocyanate in place of isocyanatoethyl methacrylate, an acrylic resin product will be produced that has the requisite carbon-to-carbon bond unsaturation required to react with styrene in gel coat composites but advantageously will exhibit improved water boil and weathering characteristics due to the lower carboxylic ester content.

TABLE 1

| EXAMPLE NO. | DRY FILM THICKNESS (MIL) | BOILING WATER TEST | | | QUV WEATHERING | | |
| --- | --- | --- | --- | --- | --- | --- | --- |
| | | HRS. | BLISTERING | LOSS OF GLOSS | HRS. | ΔE | % GLOSS RETENTION |
| 2 | 20 | 100 | Slight | Slight | 150 | 0.85 | 100 |
| | | | | | 300 | 2.99 | 60.5 |
| 4 | 20 | 100 | Slight | None | 150 | 2.34 | 88.4 |
| | | | | | 300 | 3.13 | 90.5 |
| CONTROL* | 20 | 100 | Moderate | Slight | 150 | 8.68 | 75.0 |
| | | | | | 300 | 8.66 | 3.6 |

*Conventional unsaturated polyester gel coat.

I claim:

1. An improved thermosetting gel coat resin composition adapted to heat react and form a hardened gel coat, the gel coat resin composition consisting essentially of on a weight basis:

between 50% and 90% of a low molecular weight acrylic resin having a number average molecular weight between 550 and 3,000, said acrylic resin having pendant ethylenically unsaturated groups and produced by reacting an acrylic copolymer which is an acrylate or methacrylate copolymer having multiple epoxide groups with lesser equivalents of acrylic or methacrylic acid to produce the pendant unsaturation groups, where the acrylic copolymer has a number average molecular weight between 500 and 2500; and between 10% and 50% of an aromatic vinyl monomer adapted to coreact with the pendant ethylenically unsaturated groups of the low molecular weight acrylic resin to form a thermoset gel coat.

2. The gel coat resin composition in claim 1 where the acrylic copolymer was produced by copolymerization of ethylenically unsaturated monomers including between 20% and 90% of glycidyl monomers based on the weight of copolymerized monomers to produce the acrylic copolymer having glycidyl groups.

3. The gel coat resin composition in claim 1 wherein the acrylic copolymer is a solution copolymer comprising butyl acrylate and glycidyl methacrylate which is further reacted with methacrylic acid to provide a copolymer having pendant unsaturation.

4. The gel coat resin composition of claim 1 wherein the acrylic copolymer comprises acrylate copolymer having pendant unsaturated acrylate ester linkages.

5. The gel coat resin composition of claim 1 wherein the acrylic copolymer comprises methacrylate copolymer having pendant unsaturated methacrylate ester linkages.

6. The gel coat resin composition of claim 1 wherein the acrylic copolymer comprises copolymerized monomers consisting of one or more acrylate alkyl esters, and one or more glycidyl acrylates or methacrylates.

7. The gel coat resin composition of claim 1 where the resin contains pigment and the composition is a pigmented gel coat resin.

* * * * *